Patented Dec. 18, 1928.

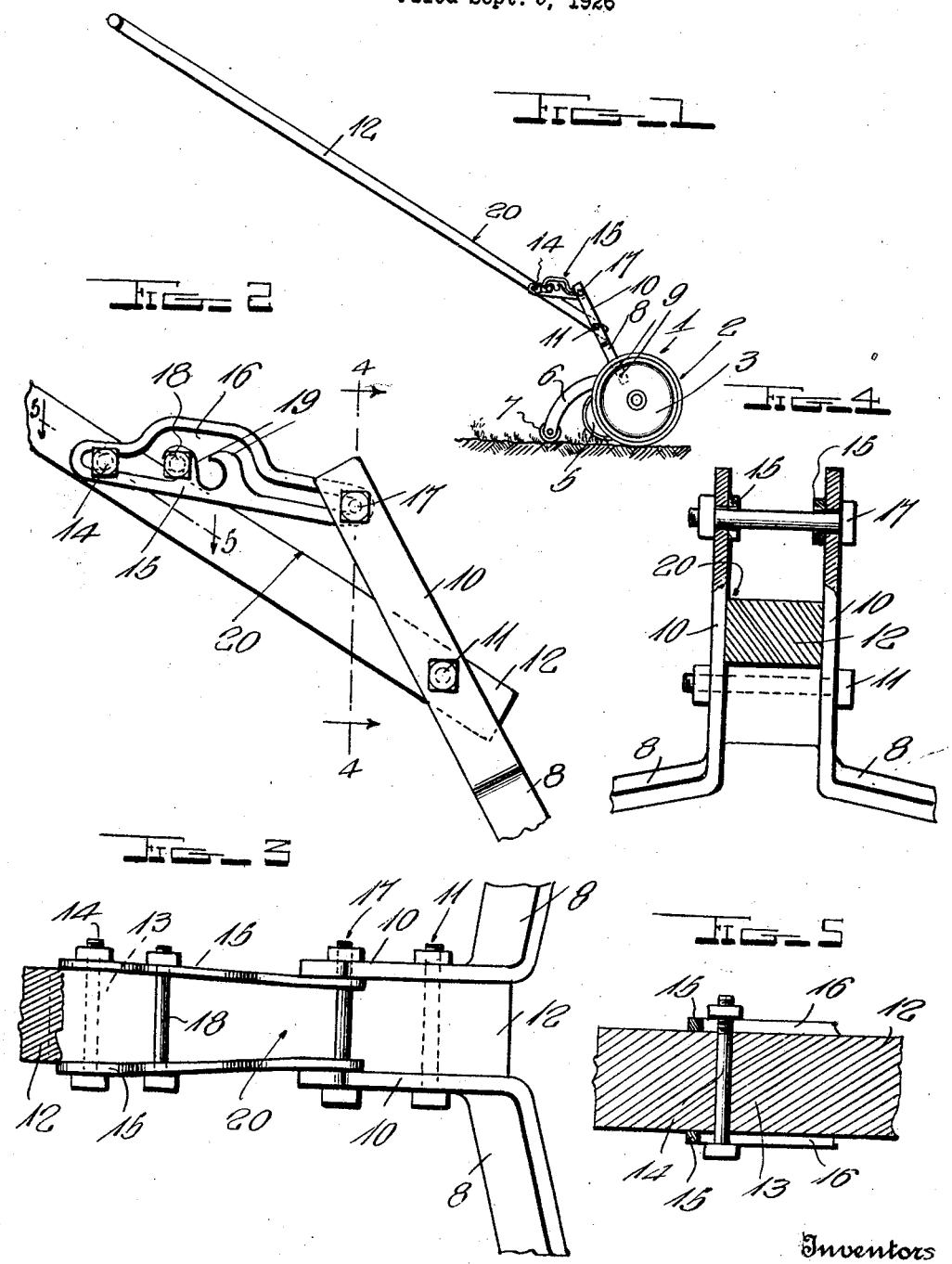

1,695,438

UNITED STATES PATENT OFFICE.

ANATOLE PANALLE AND GRANT ALEXANDER, OF WASHINGTON, DISTRICT OF COLUMBIA.

LAWN-MOWER ATTACHMENT.

Application filed September 3, 1926. Serial No. 133,476.

Our present invention pertains to lawn mowers and it contemplates the provision of a simple and inexpensive device in the nature of an attachment for lawn mowers through the medium of which a lawn regardless of declivities or the like may be readily mowed with but a slight amount of effort on the part of the person operating the mower.

Before entering into a detailed description of our invention, we would say that it is a well known fact that with mowers now on the market the cutting of the sloping portion of a lawn especially if the declivity is a steep or long one, is attended with a great amount of work and the results accomplished are not satisfactory because in cutting said incline or declivity the angle which attains at all times in lawn mowers is only the proper angle when the mower is moved over a flat surface but no account is taken for depressions or inclines over which the mower must sometimes be moved and it is the purpose of this invention to at all times have the cutting blades at the proper angle with respect to the ground regardless of the contour of said ground.

Other objects and characteristic advantages of the invention will be fully understood from the following description and claim when the same are read in connection with the drawings accompanying and forming part of this specification, in which:

Figure 1 is a side elevation of a lawn mower equipped with our novel improvements.

Figure 2 is a detail view of our improvements and showing a portion of the handle and bail of the mower.

Figure 3 is a top plan view of Figure 2.

Figure 4 is a view taken in the plane indicated by line 4—4 of Figure 2 and looking in the direction of the arrows.

Figure 5 is a transverse sectional view taken in the plane indicated by the line 5—5 of Figure 2 and looking in the direction of the arrows.

Similar numerals of reference designate corresponding parts in all the views of the drawings.

Our novel mower attachment is adapted for use in connection with the conventional lawn mower indicated by 1 and having the driving wheels 2 mounted on the usual stationary body 3 that in turn carries the cutting disks 5. Depending from the body 3 is an arm 6 that is provided on its end with a ground roller 7 while extending upwardly from the body are the usual bails 8 that are bolted to said body at 9, as clearly shown in Figure 1. The said bails 8 are provided with the arms 10 and the said arms 10 are pivoted at 11 to the mower handle 12.

The elements thus far described are conventional in that they comprise the complete fixtures that go to make up the ordinary well known mower. However, the ends of the arms 10 in the ordinary mower are bolted to the handle not only at the point 11 but at a point further up on the handle and in such construction the cutting blades retain a rigid position and similar angle with respect to the ground at all times.

We take the ordinary handle 12 of the lawn mower and form therein the aperture 13 to receive the bolt 14. Adapted to straddle the bar 12 are the members or brackets 15 having the slots 16 that terminate in one end in a portion that is engaged by the bolt 14 and nut thereof and at their forward ends the brackets 15 have the slot 16 that are constructed to be confined by a bolt 17. This bolt 17 like the bolt 14 engages both of the members 15 as shown in Figure 3 and in addition thereto the forward ends of the members 15 are confined between the arms 10 of the bails 8. The said arms 10 bear against the outer surfaces of the members 15 and the said members are pivotally secured to the arms 10 by means of the bolt 17 that passes through the members 15 and arms 10.

Adapted to rest on the handle 12 is a bolt 18 and the handle 12 may be notched if desired so as to receive the said bolt but this is not absolutely necessary. The members 15 are provided with the teeth or keepers 19 that engage the bolt 18 to prevent sagging of the arms 10 with respect to the handle 12. It will be seen that the bolt 18 rests upon the upper surface 20 of the handle 12 but at this point we would distinctly have it understood that an off-set slot or surface grooves may be formed in the upper face 20 of the handle 12 to engage the bolt 18 if so desired. We would distinctly have it understood that the ordinary lawn mower is provided with the arms 10 of the bail 8 and is generally attached to the handle by means of bolts similar to 11 and at the same point and bolts similar to 17 that would engage the handle 12 were the arms 10 thrown into the same plane as the handle. In constructing our device we take the ordinary lawn mower now in use and employ the nut and bolt 11 as a pivot and remove the bolt 17 from the handle and use it at the point shown in Figure 2.

It will be gathered from the foregoing that by hinging the bails 8 in a flexible manner as with the instant device, the cutting blades will at all times be in proper position and angle for the best cutting operation and with respect to the ground regardless of the surface, declivities, inclines, hollows and the like and unless in extreme cases where a slope of lawn is pitched at an extremely odd angle the initial positioning of the bails with respect to the handle will be sufficient for all flat as well as sloping surfaces and this is due to the fact that the invention hinges the blades and bails in a flexible manner with respect to the handle and the ordinary moving of the mower over a surface will automatically cause the blades to gravitate and recede with respect to the handle to permit proper cutting or mowing of a lawn.

Our novel device is extremely simple in construction and notwithstanding its modest cost there is no necessity for replacement of elements because said elements are so constructed that wear and inoperativeness are eliminated. We might add however that when desired a handle of greater length than that ordinarily provided with lawn mowers may be used.

We have illustrated and described the elements of our invention as the same appear to us as being in their most practical and inexpensive arrangement at this time, but we reserve to ourselves the right to make such changes or modifications in the future practice of this invention as may fairly fall within the scope of the claim appended.

What we claim is:—

In a device for adjusting the cutting element of a lawn mower with respect to a lawn, the combination of a handle, two identically constructed plates having apertures therein, a toothed rack formed on the plates, a bolt adapted to pass through the handle and engage the plates on each side thereof and a second bolt adapted to rest in the rack of the plates and bear on the handle, and a third bolt adapted to engage the bail of the mower, whereby positioning of the mower at various angles with respect to the handle and lawn is accomplished by moving the second bolt along the rack so as to engage various teeth thereof.

In testimony whereof we have hereunto set our hands.

ANATOLE PANALLE.
GRANT ALEXANDER.